Oct. 11, 1938.  J. MINICH  2,133,174
ELECTRICALLY OPERATED VALVE FOR BATHTUBS
Filed May 19, 1936  2 Sheets-Sheet 1
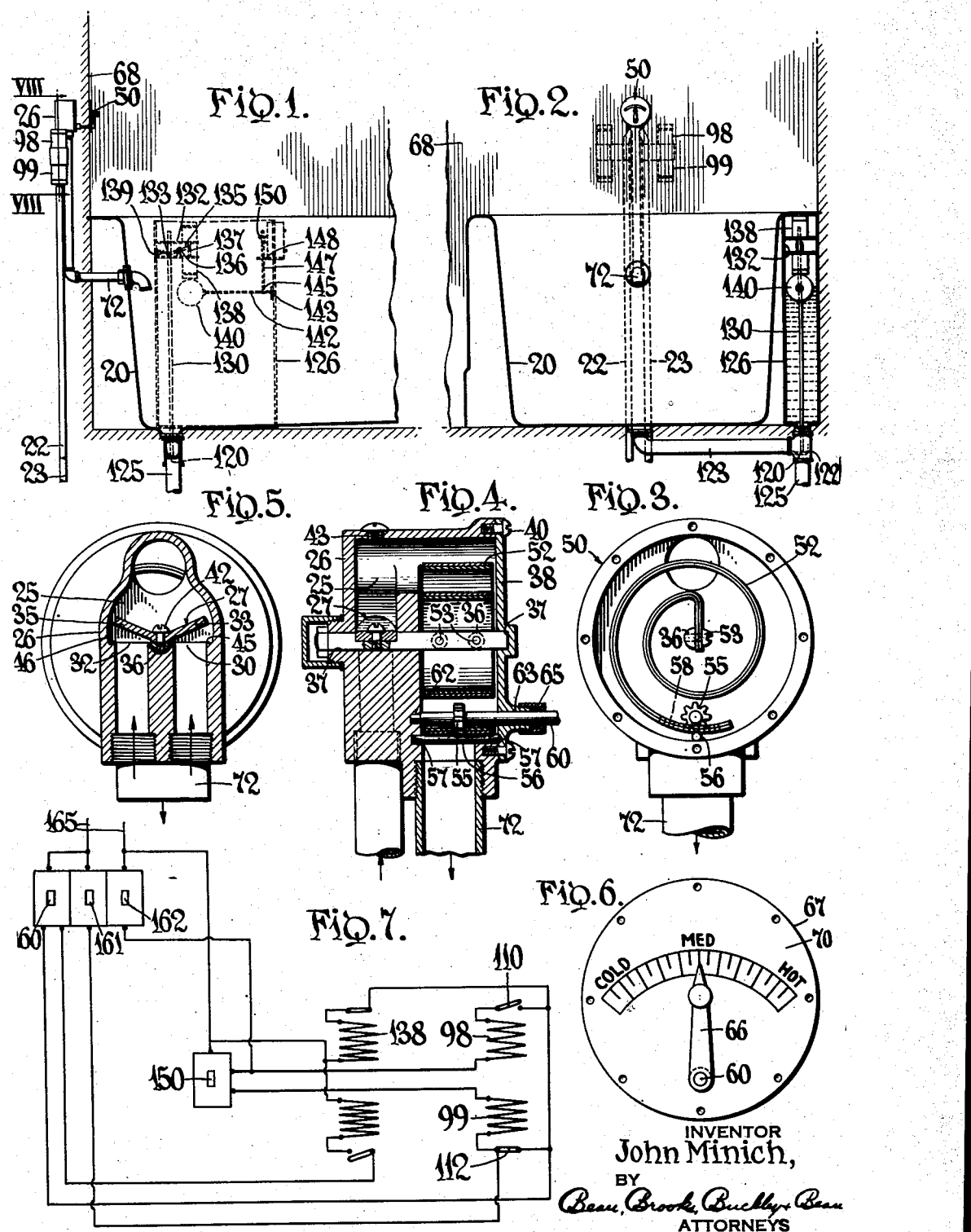
INVENTOR
John Minich,
BY
Bean, Brook, Buckley & Bean
ATTORNEYS

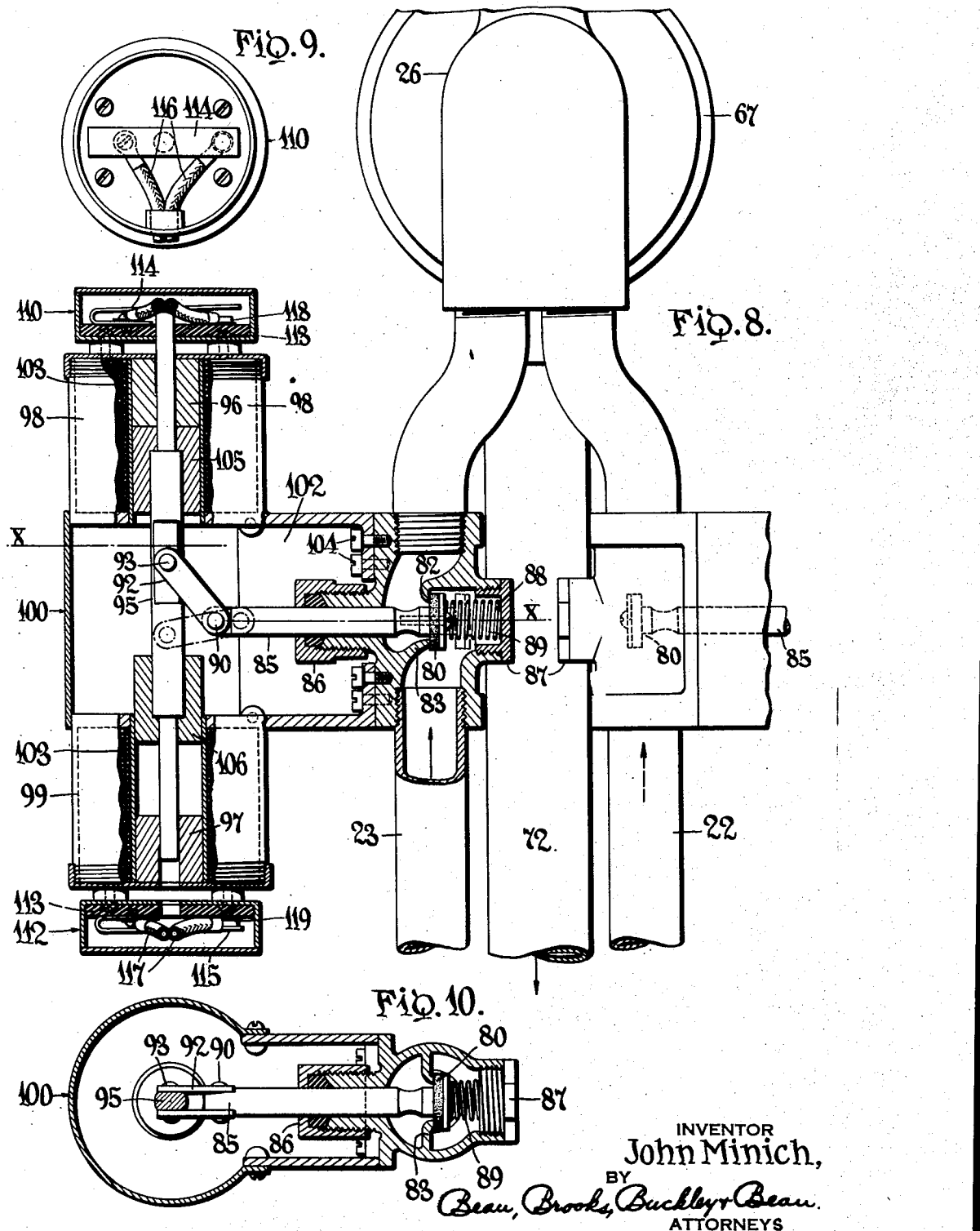

Patented Oct. 11, 1938

2,133,174

UNITED STATES PATENT OFFICE 2,133,174

ELECTRICALLY OPERATED VALVE FOR BATHTUBS

John Minich, Buffalo, N. Y.

Application May 19, 1936, Serial No. 80,531

2 Claims. (Cl. 137—139)

This invention relates to electrical control of flow of water to bathtubs, showers, or the like and it has particular relation to an arrangement of electrically controlled valves for regulating the temperature of water supplied to bathtubs, for showers, lavatories, and the like.

One object of the invention is to provide an improved arrangement of electrically controlled valves for automatic delivery of hot and cold water in various predetermined proportions which will provide a bath at a desired temperature, and which can be energized from a location remote from the delivery of the water.

Another object of the invention is to provide an improved combination of thermostat and electrically controlled valves for supplying water at various predetermined temperatures, and which under certain predetermined conditions the water itself cooperates with the valves in controlling the flow of water.

Another object of the invention is to provide an improved electrically controlled valve construction adapted to supply water under predetermined conditions of temperature.

Referring to the drawings:

Fig. 1 is a fragmentary vertical section of a plumbing installation, including a bathtub, and taken longitudinally thereof for illustrating diagrammatically the principal features of the invention;

Fig. 2 is a fragmentary vertical section of a plumbing installation, including a bathtub, and taken transversely thereof for illustrating diagrammatically the arrangement of elements of the invention;

Fig. 3 is a rear elevation, on a larger scale, of a thermostat and valve control structure incorporated in the invention;

Fig. 4 is a vertical section of Fig. 3;

Fig. 5 is a vertical section of Fig. 4 and illustrating in detail a portion of valve structure;

Fig. 6 is a front elevation of a thermostat dial;

Fig. 7 is a diagram of wiring for electrical control of the elements of the invention;

Fig. 8 is a fragmentary vertical section, on a larger scale, taken substantially along the line VIII—VIII of Fig. 1, and with portions shown in elevation, for illustrating the relation between electrical control elements and valve structure;

Fig. 9 is a plan of a portion of the electrical control structure shown in Fig. 8; and Fig. 10 is a horizontal section taken substantially along the line X—X of Fig. 8.

Referring to Figs. 1 and 2 of the drawings, a bathtub 20 is installed in a conventional manner and provided with a hot water supply pipe 22 and a cold water supply pipe 23, both of which communicate with mixing chamber 25 of a valve casing 26. A rotatable valve 27 mounted adjacent pipe entrances 30 and 32 of the valve chamber is provided with valve sections 33 and 35 extending rigidly at a slight angle to each other from a shaft 36 that is rotatably mounted in bearing recesses 37 provided in the walls of the mixing chamber. One wall 38 of the mixing chamber is removably secured in fluid tight relation by means of fastening devices 40. A suitable screw or rivet 42 is provided for rigidly securing the valve upon the shaft 36 and is accessible through the upper wall of the chamber by removing the plug 43. In its neutral position (Fig. 5) the valve 27 is so related to valve seats 45 and 46 formed at the entrances to the mixing chamber, that the valve sections 33 and 35 are spaced therefrom in open relation and the mixing chamber is then directly in communication with the hot and cold water supply pipes to receive flow of water therefrom.

The casing 26 has a thermostat 50 installed in conjunction therewith, and the latter includes a bimetallic strip 52 wound into spiral form and having its inner end secured rigidly, as indicated at 53, to the valve shaft 36, inside the mixing chamber, the other end of the spiral strip is trained between a pinion 55 and a pin 56 that is carried adjacent the pinion in the walls of the casing, as indicated at 57. The spiral strip is provided with a series of openings 58 that provide a rack-like arrangement which is engaged by the pinion. A shaft 60 rigidly supporting the pinion 55 is rotatably mounted at one end in a bearing opening 62 formed in an inner wall of the mixing chamber and an intermediate portion of the shaft is mounted in a bearing opening 63 that is provided with a fluid tight stuffing box 65 in the outer wall of the mixing chamber.

The outer end portion of the shaft 60 is provided with a pointer arm 66 and a casing 67 extends from a wall portion 68 of a building for surrounding the shaft 60 and for supporting a dial 70 about which the pointer is movable. The face of the dial is provided with graduations and legends indicating degrees of temperature, and by setting the pointer at a predetermined position upon the graduations the spiral strip is coiled or uncoiled, as the case may be, a predetermined degree so as to respond to the temperature of the water flowing into the mixing chamber to control the temperature of such water according to the setting of the pointer on the dial.

A pipe 72 in communication with the mixing chamber 25 discharges into the bathtub in a conventional manner.

The hot and cold water supply pipes 22 and 23 are each provided with a control valve 80 and valve seat 82, the latter of which is formed on a partition 83 extending across the pipe and so arranged that the valve opens transversely of the pipe. Each valve has a stem 85 that is rigid therewith and extends laterally from the pipe in which it is mounted through a fluid tight stuffing box 86 of conventional structure carried rigidly on the pipe. Each pipe is provided with a plug 87 screwed therein in fluid tight relation in alinement with the valve 80 and is provided with a socket 88 for seating one end of a compression spring 89 that has its other end bearing against the valve and constantly tending to maintain the latter pressed in closed relation against the valve seat 82.

Each valve stem 85 has a pivotal connection 90 securing its outer end to one end of a link 92 which in turn has its other end pivotally connected, as indicated at 93, to an intermediate portion of a rod 95. Opposite end portions of the rod are slidably carried in core sections 96 and 97 of upper and lower solenoids 98 and 99, respectively, and these solenoids are carried in a housing or casing 100 at opposite ends of the latter in such spaced relation as to provide a central chamber 102 in which the link 92 and valve stem 85 operate. Coils 103 of the solenoids are confined in the casing about the core sections.

The casing 100 for each water supply pipe is rigidly secured thereto by conventional fastening devices 104.

Two spaced core sections 105 and 106 of the solenoid structures are carried rigidly upon the slidable rod 95 and are adapted to be moved in opposite directions until the section 105 abuts the section 96 or until the section 106 abuts the section 97. Such movement of the movable sections with the rod cause opening and closing of the valve 80.

When the elements described are in the position shown in full lines of Fig. 8, the valve 80 is closed and the link 92 is inactive except to maintain the rod 95, in cooperation with the spring 89, in the position shown until the rod is actuated to a lower position. However, by movement of the rod 95 downwardly until the core section 106 abuts the core section 97 the link 92 is moved to its broken line position (Fig. 8) and beyond its dead center position. In such position the link 92 maintains the valve 80 open against the compression of the spring 89 and is positive in its action. As soon as the rod 95 is moved back to its full line position (Fig. 8) the valve is again closed positively by the compression spring 89.

Electric switch mechanisms 110 and 112 are mounted upon upper and lower ends of the solenoid housing 100 by means of suitable fastening devices 113, the upper and lower ends of the rod 95 are adapted to engage alternately resilient contact members 114 and 115 in its upward and downward movement, respectively. Suitable conductors 116 and 117 are connected to the contact members 114 and 115, respectively, and are provided with upper and lower terminals 118 and 119. In their normal positions, the contact members 114 and 115, under the influence of their resiliency, engage the terminals 118 and 119, respectively.

It should be understood that the upper end of the rod 95 in its upward movement, as a result of energization of the solenoid 98, strikes the contact member and moves it away from the terminal 118 to break the electric circuit through the solenoid. At the same time, or in the same upward movement of the rod, the lower end of the latter is moved away from the lower contact member 115 which then engages the terminal 119 under the influence of its resiliency. Therefore, it is apparent that the circuits through the upper conductors 116 and the lower conductors 117 cannot be closed concurrently.

A stopper valve 120 is provided for the bathtub in a valve casing 122 that communicates by means of a pipe section 123 into the bottom of the bathtub, and also communicates with a drain pipe 125 through which waste water escapes. The casing 122 also is connected to, and is in direct communication with, a container 126 which, through the casing 122 and pipe section 123, is constantly in direct communication with the bathtub. The container 126 is mounted against the side of the bathtub by conventional means.

A vertical rod 130 forming a part of the stopper valve 120 extends slidably through a bracket 132 that is carried rigidly upon the upper wall portion of the container 126, and has a pivotal connection 133 securing it to one end of a lever 135. An intermediate portion of the lever 135 has a pivotal connection 136 securing it to the bracket 132 and the other end portion of the lever is connected to a vertically reciprocable rod 137 of solenoids 138 that are similar to the solenoids 98 and 99 previously described. In order to maintain the rod 137 in a raised or lowered position, a compression spring 139 is disposed between the pivotal connection 133 at the end of the lever and the adjacent wall of the container. In moving from its raised or lowered position the rod moves the spring through its dead center position and hence, the spring exerts force yieldably resisting movement of the rod from either position.

A float 140 is also disposed in the container 126 and is provided with a rod 142 that has one end connected to the float while its other end has a pivotal connection 143 securing it to a wall of the container. At an intermediate portion of the rod a pivotal connection 145 is provided that secures an upright switch actuating arm 147 thereto. A guide 148 is secured to the wall of the container for preventing displacement of the arm 147 from its proper path of upward and downward movement in actuating a switch element 150 to which it is articulated. As the water in the bathtub approaches a predetermined level, the same level occurs in the container 126 and the float actuates the switch elements 150 for electrically operating the solenoids 98 whereby each water supplying valve 80 is closed. As the water is drained from the bathtub the float 140 actuates the switch elements 150 to restore them to the position for completing the electric circuit to the solenoids 98 when the tub is again filled to the desired level.

A wiring diagram shown in Fig. 7 is illustrative of the manner in which the operation of the solenoids is controlled. A plurality of switches 160, 161 and 162, together with the switch elements 150, previously described, are associated with electric mains 165 for supplying electric energy to the entire system. Assuming that it is desired to fill the bathtub with water, the switch 160 is first actuated, or turned on, to provide for energization of the upper solenoid 138 to close the stopper valve 120, and, at the same time the electric circuit is completed through the solenoids 99 that are operated to open the valves in the water supply pipes 22 and 23. Upon completion of energization of the solenoids 99, the circuit is broken automatically by separation of the contact member 115 from the terminal 119 incidental to the actuation of the rod 95 in the manner previously described, but this breaking of the circuit does not affect the closed stopper valve.

The water continues to flow through the mixing chamber 25 and is regulated as to temperature according to the setting of the thermostat pointer and the resulting operation of the valve 27. When the water reaches a predetermined level the float 140 automatically actuates the switch elements 150, whereupon the circuit through the solenoids 98 is completed and the valves 80 are again closed. When the switch 160 is manually actuated to its original position, that is, turned off, the stopper valve is opened and the valves closed.

The switch 161 can be manually actuated to open the valves 80 independently without operating the stopper valve and the valve 162 then can be operated to close the valves 80 independently without operating the stopper valve. In fact the switches 161 and 162 function as a two-way switch.

If only cold water is desired, the thermostat pointer is set upon the dial at the location which indicates that cold water is to be supplied. Conversely, the pointer is set to indicate hot water, when the latter is desired. Intermediate setting of the pointer on the dial is effected according to the degree of mixture of hot and cold water desired.

It is to be understood that the manually operable switches are not necessarily located in proximity to the bathtub, but may be located at any desired remote location; for example, in a bed room at the bedside, whereby a bath may be drawn by a person before he arises, and the bath will be ready at the time he approaches the bathroom. It is also apparent from this disclosure that the electric circuits described can be modified in a conventional manner to provide independently operable switches for controlling either of the two valves 80 independently.

Although only one form of the invention has been shown and described in detail, it will be apparent to those skilled in the art that the invention is not so limited but that various changes can be made therein without departing from the spirit of the invention or from the scope of the appended claims.

I claim:

1. In an electrically controlled apparatus including a fluid conveying pipe, an electrically operable valve in said pipe for controlling the supply of fluid therethrough and closing in the direction of flow of fluid whereby the fluid tends to maintain the valve closed in its closed position, a pair of coaxially disposed solenoids having a common reciprocable core member, electric circuit means having switch means connected to the outer ends of said solenoids for alternately energizing the latter, said valve having a stem portion slidable axially in fluid tight relation transversely through the wall of said pipe for opening and closing action of the valve, a link pivotally connected to the stem portion and to said reciprocable core member and operable pivotally through a dead center position in response to reciprocable movement of the core member to open and close the valve, a resilient member connected to the valve and cooperating with the link and core member to maintain the valve in either open or closed position depending upon which side of the dead center position the link is disposed, and means in the circuit means for automatically de-energizing either solenoid in response to movement of the reciprocable core member and depending upon the direction of movement of said core member.

2. In an electrically controlled apparatus including a fluid conveying conduit, an electrically operable valve in said conduit for controlling the fluid supply therethrough, a pair of coaxially alined solenoids having a common inherently rigid reciprocable core member, an oblong casing supporting the solenoids in opposite end portions thereof, electric circuit means having switch means for alternately energizing the solenoids, said valve having a stem portion slidable axially in fluid tight relation transversely through the wall of said conduit for opening and closing action of the valve, the seating portion of the valve being disposed on the inner end of said stem portion, a link pivotally connected to the stem portion and to said core member and operable pivotally through a dead center position in response to reciprocable movement of the core member to open and close the valve, a resilient member engaging the valve in the conduit beyond the inner end of the stem portion and constantly exerting force tending to close the valve and further exerting force tending to maintain the core member in either position of its reciprocable limits of movement after it has been electrically actuated, and contact members mounted upon the opposite end portions of said casing and connected to the solenoids and in the path of opposite end portions of the core, whereby the electric circuits through the solenoids are broken upon reciprocation of the core member.

JOHN MINICH.